United States Patent
Gad et al.

(10) Patent No.: US 12,301,345 B2
(45) Date of Patent: May 13, 2025

(54) FACILITATING DYNAMIC PREDICTIVE MODULATION CODING ADJUSTMENT FOR INTERCELL INTERFERENCE IN ADVANCED COMMUNICATION NETWORKS

(71) Applicant: Dell Products, L.P., Round Rock, TX (US)

(72) Inventors: Omar Gad, London (GB); Nada Elsammak, Egypt (EG); Amr Morsey, Egypt (EG); Marwan Mansour, Egypt (EG)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/354,760

(22) Filed: Jul. 19, 2023

(65) Prior Publication Data
US 2025/0030498 A1    Jan. 23, 2025

(51) Int. Cl.
*H04L 1/00* (2006.01)
*H04L 1/20* (2006.01)

(52) U.S. Cl.
CPC .......... *H04L 1/0003* (2013.01); *H04L 1/0009* (2013.01); *H04L 1/203* (2013.01)

(58) Field of Classification Search
CPC ...... H04L 1/0003; H04L 1/0009; H04L 1/203
See application file for complete search history.

(56) References Cited

U.S. PATENT DOCUMENTS

| | | | |
|---|---|---|---|
| 2003/0021243 A1* | 1/2003 | Hamalainen | H04W 52/241 370/252 |
| 2010/0003934 A1* | 1/2010 | Visoz | H04L 1/0025 455/115.3 |
| 2017/0202041 A1* | 7/2017 | Qin | H04W 76/14 |
| 2019/0312708 A1* | 10/2019 | Bai | H04W 72/21 |
| 2021/0306874 A1* | 9/2021 | Bedekar | H04W 74/0833 |
| 2022/0399952 A1* | 12/2022 | Elshafie | H04L 1/0003 |

OTHER PUBLICATIONS

T. Ue, S. Sampei, N. Morinaga and K. Hamaguchi, "Symbol rate and modulation level-controlled adaptive modulation/TDMA/TDD system for high-bit-rate wireless data transmission," in IEEE Transactions on Vehicular Technology, vol. 47, No. 4, pp. 1134-1147, Nov. 1998. (Year: 1998).*

International Search Report and Written Opinion received for PCT Application Serial No. PCT/US2023/036302 dated Apr. 26, 2024, 18 pages.

Li et al., "A Unified Non-CQI-based AMC Scheme for 5G NR Downlink and Uplink Transmissions", 2021 IEEE the 6th International Conference on Computer and Communication Systems, Apr. 23, 2021, pp. 881-886.

* cited by examiner

*Primary Examiner* — Albert Decady
*Assistant Examiner* — Enamul M Kabir
(74) *Attorney, Agent, or Firm* — Amin, Turocy & Watson, LLP

(57) ABSTRACT

Facilitating dynamic predictive modulation coding adjustment for intercell interference in advanced communication networks is provided herein. A method includes identifying a pattern associated with unsuccessful transmissions sent to the user equipment via a network node. The method also includes, based on the pattern, determining modulation coding adjustment recommendations for future transmissions to the user equipment via the network node. Further, the method includes facilitating a conveyance of the modulation coding adjustment recommendations to the network node.

20 Claims, 11 Drawing Sheets

FACILITATING DYNAMIC PREDICTIVE MODULATION CODING ADJUSTMENT FOR INTERCELL INTERFERENCE IN ADVANCED COMMUNICATION NETWORKS

BACKGROUND

The use of computing devices is ubiquitous. Given the explosive demand placed upon mobility networks and the advent of advanced use cases (e.g., streaming, gaming, and so on), intercell interference can increase due to multiple equipment transmitting data substantially at a same time. The increase in intercell interference can be attributed to the exponential increase in the network traffic flowing through the advanced network and the need for intercell interference mitigation. Accordingly, unique challenges exist related to network efficiency and in view of forthcoming Fifth Generation (5G), New Radio (NR), Sixth Generation (6G), or other next generation, standards for network communication.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a method is provided that includes, based on user equipment feedback associated with a user equipment, identifying, by network equipment comprising a processor, a pattern associated with unsuccessful transmissions sent to the user equipment via a network node. The method also includes, based on the pattern, determining, by the network equipment, modulation coding adjustment recommendations for future transmissions to the user equipment via the network node. Further, the method includes facilitating, by the network equipment, a conveyance of the modulation coding adjustment recommendations to the network node.

The user equipment feedback can include at least one of hybrid automatic repeat request information and reference signal received quality information. According to some implementations, the user equipment feedback can include indications of previous successful transmissions and previous unsuccessful transmissions to the user equipment via the network node and time information associated with the previous successful transmissions and the previous unsuccessful transmissions to the user equipment via the network node. The time information can indicate time slots of the previous successful transmissions and the previous unsuccessful transmissions to the user equipment via the network node. The modulation coding adjustment recommendations comprise data rate recommendations for the time slots of the future transmissions to the user equipment via the network node.

In accordance with some implementations, determining the modulation coding adjustment recommendations can include applying machine learning to the user equipment feedback in order to receive an output from the machine learning comprising the modulation coding adjustment recommendations.

According to some implementations, determining the modulation coding adjustment recommendations can include assigning a severity rate to previous unsuccessful transmissions. Further, based on the severity rate being determined to fail to satisfy a defined criterion, a determination can be made to perform a first decrease of a current modulation coding by a first value. Alternatively, based on the severity rate being determined to satisfy the defined criterion, a determination can be made to perform a second decrease of the current modulation coding by a second value, wherein the second value is larger than the first value. The terms "first decrease," "second decrease," "first value," "second value," and the like, are used herein to distinguish the respective decreases, values, and so on from one another.

According to some implementations, determining the modulation coding adjustment recommendations can include determining the modulation coding adjustment recommendations based on a transmission time interval basis. In some implementations, identifying the pattern, determining the modulation coding adjustment recommendations, and facilitating the conveyance are performed in a repeating cycle having a cycle frequency.

Another embodiment relates to network equipment that includes a processor and a memory that stores executable instructions that, when executed by the processor, facilitate performance of operations. The operations can include sending user equipment feedback to a controller. The operations can also include receiving, from the controller, modulation coding adjustment recommendations to apply to future transmissions to a user equipment via the network equipment, wherein the modulation coding adjustment recommendations were determined based on the user equipment feedback. After the receiving, the operations can include using the modulation coding adjustment recommendations to send a transmission of the future transmissions to the user equipment at a defined data rate. Further, the operations can include sending the transmission to the user equipment using the defined data rate.

In some implementations, the user equipment feedback can include indications of previous successful transmissions and previous unsuccessful transmissions to the user equipment via the network equipment. Further, the user equipment feedback can include time information associated with the previous successful transmissions and the previous unsuccessful transmissions to the user equipment via the network equipment. The time information can indicate time slots of the previous successful transmissions and the previous unsuccessful transmissions to the user equipment via the network equipment. Additionally, the modulation coding adjustment recommendations can include time slot recommendations for data rates of the future transmissions to the user equipment via the network equipment.

The user equipment feedback comprises at least one of hybrid automatic repeat request information or reference signal received quality information. Sending the user equipment feedback and receiving the modulation coding adjustment recommendations can be performed in a repeating cycle having a cycle frequency. In an example, sending the user equipment feedback to the controller can be performed in response to a request from the controller. The network equipment can be configured to operate according to at least a fifth generation network communication protocol.

According to another embodiment, provided herein is a non-transitory machine-readable medium, comprising executable instructions that, when executed by a processor of network equipment, facilitate performance of operations. The operations can include, based on user equipment feedback, identifying a recurring pattern of unsuccessful transmissions sent to a user equipment via a network node. The operations can also include, based on the recurring pattern, determining rate adjustment recommendations to apply to future transmissions to the user equipment via the network node. Further, the operations can include sending the rate adjustment recommendations to the network node.

In an implementation, determining the rate adjustment recommendations can include determining the rate adjustment recommendations on a transmission time interval basis. In some implementations, determining the rate adjustment recommendations can include assigning a severity rate to previous unsuccessful transmissions. Based on the severity rate being determined to fail to satisfy a function of a defined amount, a first decrease of a current modulation coding by a first value can be determined. Alternatively, based on the severity rate being determined to satisfy the function of the defined amount, a second decrease of the current modulation coding by a second value can be determined. The second value is larger than the first value.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

In a wireless communication network, as the number of active user equipment (UEs) increases, there is a related increase in the amount of intercell interference. This intercell interference decreases bandwidth efficiency and can violate the UEs Quality of Service (QoS), which can result in a negative user experience. Such impact on QoS varies according to the type of traffic and the specified Service Level Agreement (SLA).

The interference related information corresponds to per-User Equipment (UE) transmission time interval (TTI)-level interference (e.g., Hybrid Automatic Repeat Request (HARQ) feedback list, Signal-to-Interference-Plus-Noise Ratio (SINR) measurements, and so on). The TTI-level interference can impact the Central Processing Unit (CPU) utilization and memory on Network Function capability.

Interference avoidance that has been implemented is a reactive type of interference avoidance. This means that there is some throughput that is lost by having to retransmit several packets or waiting until the BLER (block error-rate) increases past the threshold before the MCS (Modulation Coding Scheme or modulation coding procedure) is lowered to account for the sudden interference. Another problem is that after the MCS is lowered in order to combat the interference, it takes some time before the MCS recovers once the source of interference is gone, causing wasted spectral efficiency on the slot level.

Figure 1:
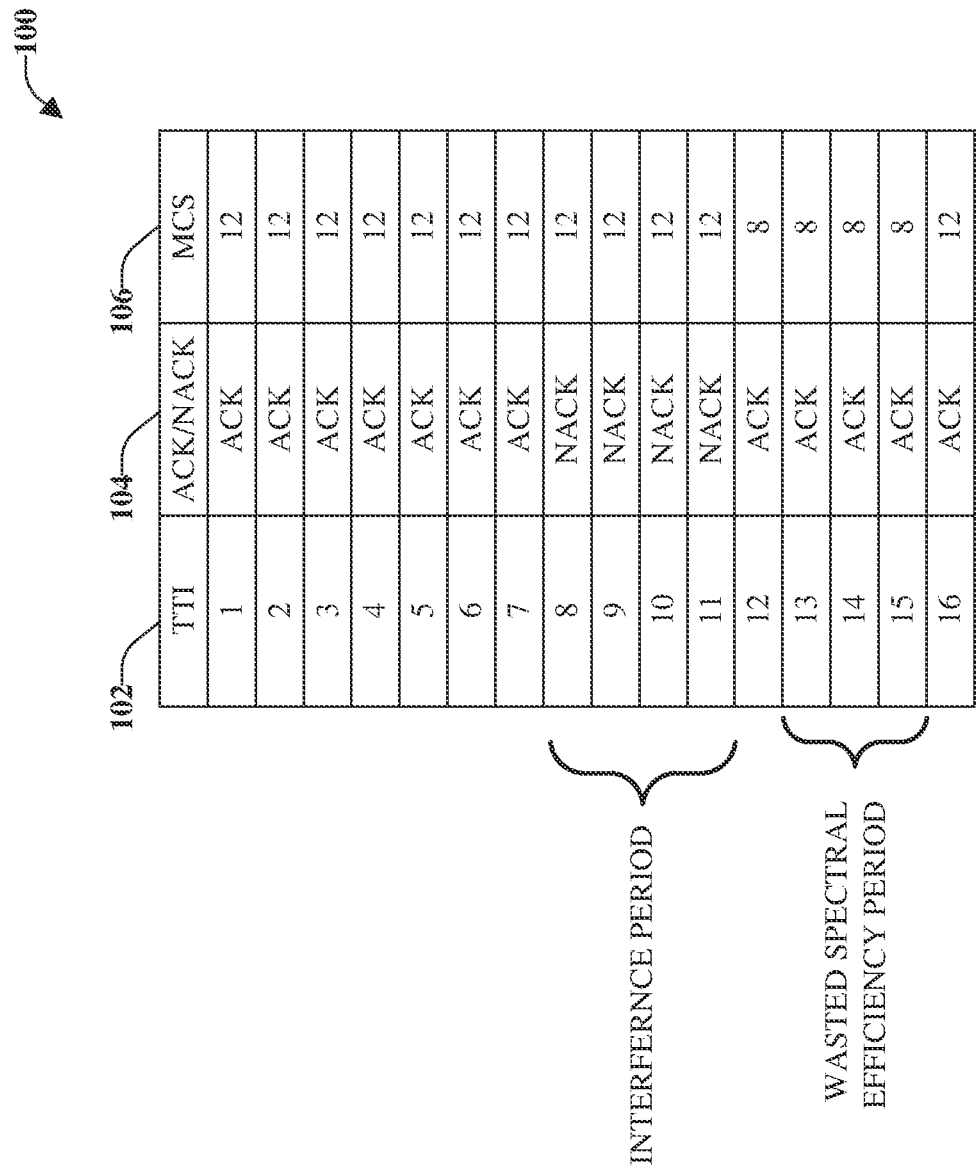
FIG. 1 illustrates an example, non-limiting, representation of downlink transmissions to a user equipment.

For example, FIG. 1 illustrates an example, non-limiting, representation of downlink transmissions 100 to a UE. The first column 102 illustrates the TTI. The second column 104 illustrates whether an Acknowledgement (ACK) or Negative-Acknowledgement (NACK) was received. The third column 106 illustrates the MSC.

As depicted, in TTIs 1 through 7, ACKs are received and the MCS is 12. However, at TTI 8, a NACK is received and NACKs continue to be received through TTI 11. Thus, from TTI 8 through TTI 11, the UE is experiencing interference. Thereafter, at TTI 12 through TTI 16, ACKs are once again received.

When the UE experiences interference (e.g., TTIs 8 through 11), it takes several NACKs before the value of the MCS is dropped by the scheduler to adjust for the change in channel conditions. In this example, the MCS is dropped at TTI 12. After the interference is over (e.g., TTI 12), the MCS doesn't recover immediately. Instead, it takes some time before the scheduler can detect the channel quality changes and the UE is reverted to the higher MCS (e.g., at TTI 16). Therefore, at TTI 13 through TTI 15, even though the interference is over, there is wasted spectral efficiency due to using low MCS when low MCS is not needed.

The various embodiments herein provide for interference avoidance that is proactive and/or predictive (e.g., based on block error-rate plus one or more UE reports). As discussed herein, network equipment (e.g., a controller) collects network measurements from E2 nodes. These network measurements are utilized to detect interference and the severity of the interference. The network equipment (e.g., a Modulation Coding Scheme (MCS) calculator) can output an MCS multiplier and/or MCS recommendation. The multiplier and/or recommendation can be sent to the E2 node to enhance the UEs Quality of Service (QOS) when the recurring interference pattern occurs again. Additionally, or alternatively, the disclosed embodiments leverage machine learning (ML) and/or artificial intelligence (AI) for interference pattern recognition, severity prediction, and/or providing recommendations.

Rather than fully banning slots and diverting UEs to use other resources, the disclosed embodiments facilitate dynamic MCS, which makes it more robust for the UEs during these slots. Further, provided is the use of ML and/or AI based interference detection and pattern recognition techniques that proactively avoid interference in periodic traffic patterns. Further, provided is a technique for providing MCS recommendations instead of banning slots. Also provided are MCS recommendations based on interference severity predictions.

The various embodiments are discussed herein with respect to an Open Radio Access Network (O-RAN), the embodiments are not so limited. Instead, the embodiments can be employed with other networks, including other disaggregated networks. The network can include one or more Radio Intelligent Controllers (RICs) (e.g., an O-RAN RIC), Service Management and Orchestration (SMO), and Distributed Units (DUs) as RAN nodes, for example. Further, modules or components within the RIC can be responsible for detecting interference, handling patterns of interference, and sending action to take effect to the DU.

Figure 2:
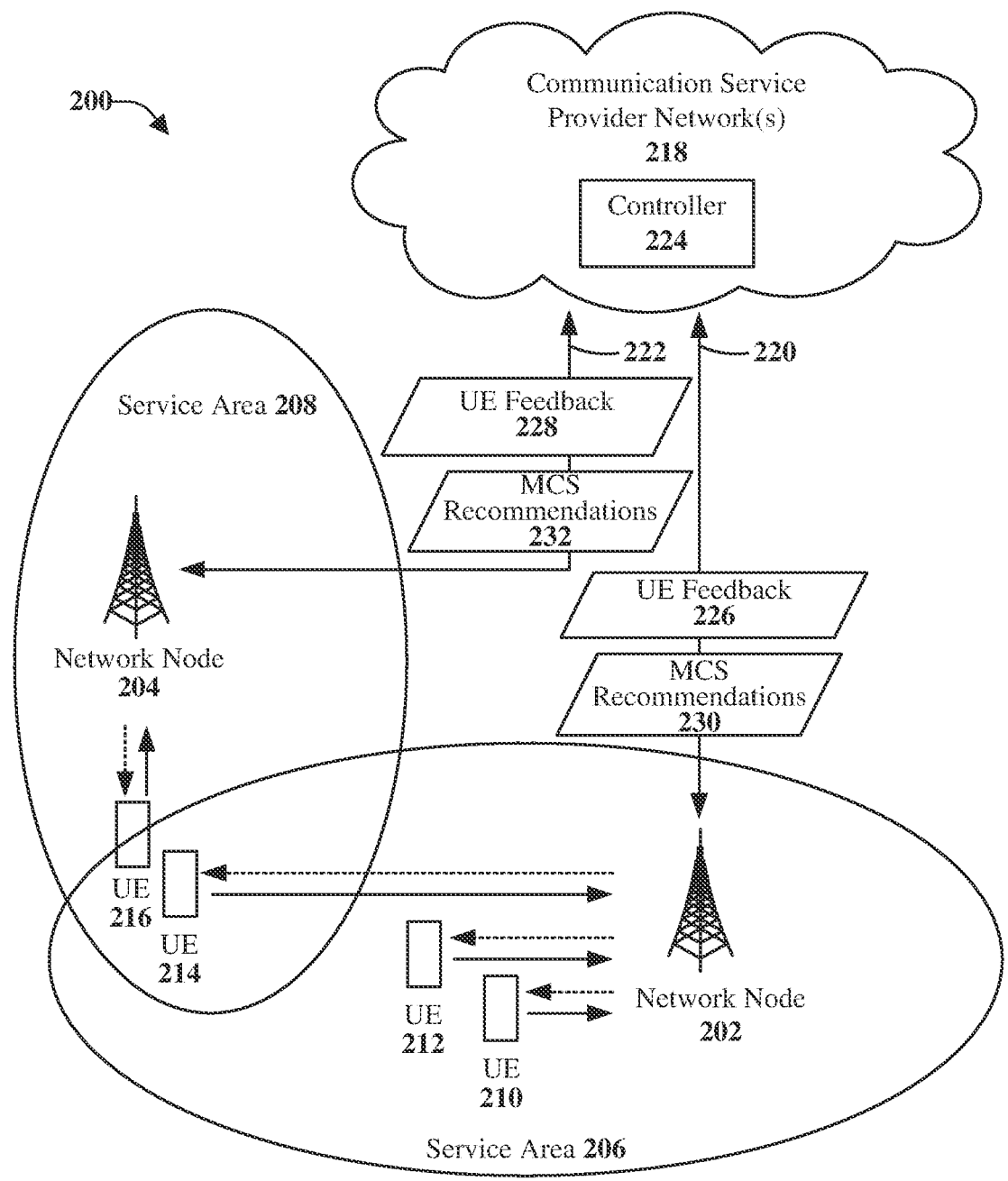
FIG. 2 illustrates an example, non-limiting, wireless communication system configured to facilitate dynamic predictive modulation coding adjustment for intercell interference in advanced communication networks in accordance with one or more embodiments described herein.

FIG. 2 illustrates an example, non-limiting, wireless communication system 200 configured to facilitate dynamic predictive modulation coding adjustment for intercell interference in advanced communication networks in accordance with one or more embodiments described herein. The wireless communication system 200 includes network equipment, illustrated as a first network node 202 and a second network node 204 of a radio access network (RAN). The first network node 202 provides wireless communication service in a first service area 206, and the second network node 204 provides wireless communication service in a second service area 208. User equipment (UE) in the first service area 206, such as UE 210, UE 212, and UE 214, can send and receive communications via the first network node 202. UE 216 in the second service area 208 can send and receive communications via the second network node 204.

The first network node 202 and the second network node 204 can communicate with communication service provider network(s) 218 via backhaul links (e.g., the first backhaul link 220, the second backhaul link 222). The communication service provider network(s) 218 can include a variety of network equipment, including, for example, a controller 224. In some embodiments, the controller 224 be configured to receive user equipment feedback 226 from the first network node 202 and UE feedback 228 from the second network node 204. Further, the controller 224 can be configured to determine respective interference patterns occurring at the respective UEs and generate one or more MCS recommendations 230 to be applied at the first network node 202 and one or more MCS recommendations 232 to be applied at the second network node 204. The one or more MCS recommendations 230 and the one or more MCS recommendations 232 can be utilized to enhance the UEs Quality of Service (QOS) when the recurring interference pattern occurs. The various MCS recommendations can be utilized without the need to perform slot banning.

The non-limiting term "user equipment" can refer to any type of device that can communicate with the first network node 202, the second network node 204, and other network nodes and/or network equipment in a cellular or mobile communication system (e.g., the wireless communication system 200). The UEs can have one or more antenna panels having vertical and horizontal elements. Examples of UEs comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs can also comprise Internet of Things (IOT) equipment or devices and/or Internet of Everything (IOE) equipment and/or devices that communicate wirelessly.

In various embodiments, the wireless communication system 200 comprises communication service provider network(s) 218 serviced by one or more wireless communication network providers. Communication service provider network(s) 218 can comprise a "core network". In example embodiments, the UEs can be communicatively coupled to the communication service provider network(s) 218 via the respective network node. The network nodes (e.g., network node devices, network equipment) can communicate with the UEs thus providing connectivity between the UEs and the wider cellular network. The UEs can send feedback data and/or other data to the network nodes.

The network nodes can each have a cabinet, other protected enclosures, computing devices, an antenna mast, and multiple antennas for performing various transmission operations (e.g., MIMO operations) and for directing/steering signal beams. The network nodes can each comprise one or more base station devices which implement features of the network node. Network nodes can serve several cells, depending on the configuration and type of antenna. In example embodiments, the UEs can send and/or receive communication data via wireless links to the network nodes. The dashed arrow lines from the network nodes to the UEs represent downlink (DL) communications to the UEs. The solid arrow lines from the UEs to the network nodes represent uplink (UL) communications.

Communication service provider network(s) 218 can facilitate providing wireless communication services to the UEs via the network nodes and/or various additional network devices (not shown) included in the one or more communication service provider network(s) 218. The one or more communication service provider network(s) 218 can comprise various types of disparate networks, including but not limited to: cellular networks, femto networks, picocell networks, microcell networks, internet protocol (IP) networks, Wi-Fi service networks, broadband service network, enterprise networks, cloud-based networks, millimeter wave networks and the like. For example, in at least one implementation, the wireless communication system 200 can be or comprise a large-scale wireless communication network that spans various geographic areas. According to this implementation, the one or more communication service provider network(s) 218 can be or comprise the wireless communication network and/or various additional devices and components of the wireless communication network (e.g., additional network devices and cell, additional UEs, network server devices, etc.).

The network nodes can be connected to the one or more communication service provider network(s) 218 via one or more backhaul links (e.g., the first backhaul link 220, the second backhaul link 222). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also comprise wireless link components, such as but not limited to, line-of-sight (LOS) or non-LOS links which can comprise terrestrial air-interfaces or deep space links (e.g., satellite communication links for navigation). The one or more backhaul links can be implemented via a "transport network" in some embodiments. In another embodiment, the network nodes can be part of an integrated access and backhaul network. This may allow easier deployment of a dense network of self-backhauled 5G cells in a more integrated manner by building upon many of the control and data channels/procedures defined for providing access to UEs.

The wireless communication system 200 can employ various cellular systems, technologies, and modulation modes to facilitate wireless radio communications between devices (e.g., the UEs and the network nodes). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, the wireless communication system 200 can operate in accordance with any 5G, next generation communication technology, or existing communication technologies, various examples of which are listed above. In this regard, various features and functionalities of the wireless communication system 200 are applicable where the devices (e.g., the UEs and the network nodes) of the wireless communication system 200 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the wireless communication system 200 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to proactively predict and/or mitigate the effects of interference while retaining the benefits of multi carrier modulation schemes (e.g., OFDM and related schemes). Such features provided herein can provide a significant contribution to the high speed/capacity and low latency demands of 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger number of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., more than 6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 3:
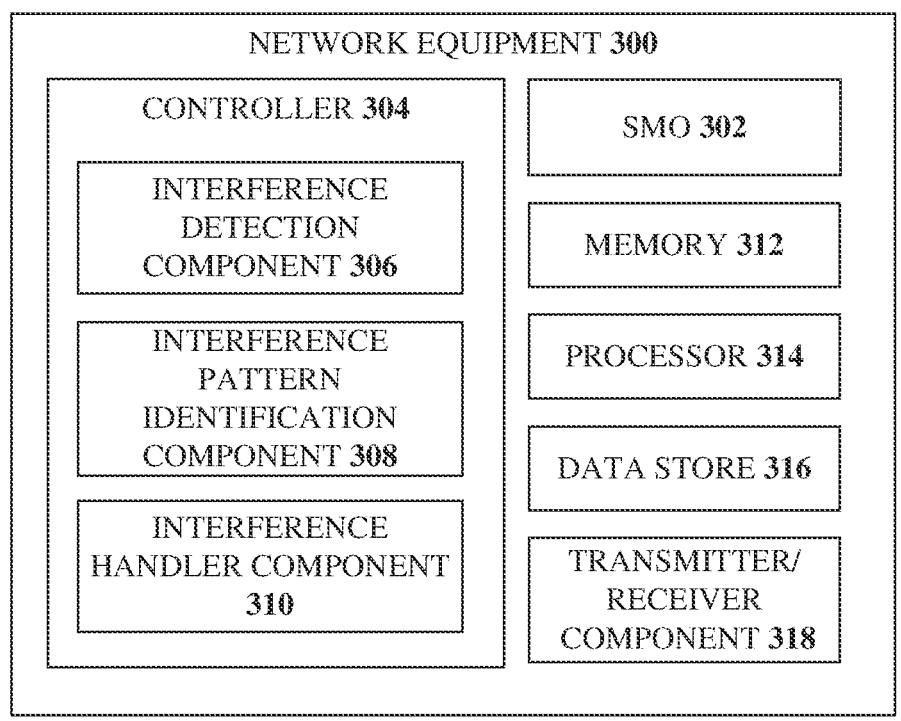
FIG. 3 illustrates an example, non-limiting, system that facilitates dynamic predictive modulation coding procedure adjustment for intercell interference in accordance with one or more embodiments described herein.

FIG. 3 illustrates an example, non-limiting, system that facilitates dynamic predictive modulation coding procedure adjustment for intercell interference in accordance with one or more embodiments described herein. The system, as well as other embodiments discussed herein, can be facilitated within various types of network architectures including, for example, disaggregated network architectures.

Aspects of systems, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system is illustrated as network equipment 300 that includes Service Management and Orchestration (SMO 302) and a controller 304. Included in the controller 304 are an interference detection component 306, an interference pattern identification component 308, and an interference handler component 310. The network equipment 300 also includes at least one memory 312, at least one processor 314, at least one data store 316 (or at least one storage device), and a transmitter/receiver component 318. The at least one memory 312 can store computer executable components and instructions. The at least one processor 314 can facilitate execution of the instructions (e.g., computer executable components and corresponding instructions) by the interference detection component 306, the interference pattern identification component 308, the interference handler component 310, the transmitter/receiver component 318, and/or other system components. As depicted, in some embodiments, one or more of: the SMO 302, the controller 304, the interference detection component 306, the interference pattern identification component 308, the interference handler component 310, the at least one memory 312, the at least one processor 314, the at least one data store 316, and the transmitter/receiver component 318 can be electrically, communicatively, and/or operatively coupled to one another to perform one or more functions of the network equipment 300.

The interference detection component 306 can analyze respective HARQ feedback (e.g., respective ACKs, respective HARQ NACKs) from one or more UEs. Based on the respective HARQ feedback, the interference detection component 306 can determine one or more interference events. Information indicative of the interference events can be conveyed to the interference pattern identification component 308. Based on this information, the interference pattern identification component 308 can identify patterns of interference for each UE.

The interference handler component 310 can determine a course of action to be taken based on the interference pattern. For example, the interference handler component 310, based on provided inputs, can determine a MCS multiplier and a recommended MCS. The interference handler component 310 can also transmit (e.g., via the transmitter/receiver component 318) one or more suggested actions to a DU MAC scheduler.

The at least one data store 316 can store one or more performance indicators (e.g., key performance indicators). Further, the at least one data store 316 can store interference pattern information. Further details related to the controller 304 will be provided below with respect to the following figures.

The at least one memory 312 can be operatively connected to the at least one processor 314. The at least one memory 312 can store executable instructions and/or computer executable components (e.g., the interference detection component 306, the interference pattern identification component 308, the interference handler component 310, the transmitter/receiver component 318, and so on) that, when executed by the at least one processor 314 can facilitate performance of operations (e.g., the operations discussed with respect to the various use cases, dynamic predictive modulation coding procedure adjustments, methods, and/or systems discussed herein). Further, the at least one processor 314 can be utilized to execute the computer executable components stored in the at least one memory 312.

For example, the at least one memory 312 can store protocols associated with facilitating dynamic predictive MCS adjustment as discussed herein. Further, the at least one memory 312 can facilitate action to control communication between the network equipment 300 other network equipment, and/or various user equipment, such that the network equipment 300 employs stored protocols and/or algorithms to achieve improved overall performance based on proactive MCS adjustments as described herein.

It should be appreciated that data stores (e.g., memories) components described herein can be either volatile memory or nonvolatile memory or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 314 can facilitate respective analysis of information related to facilitating proactive MCS adjustment in advanced networks. The at least one processor 314 can be a processor dedicated to analyzing and/or generating information received, a processor that controls one or more components of the network equipment 300, and/or a processor that both analyzes and generates information received and controls one or more components of the network equipment 300.

The transmitter/receiver component 318 can receive information and/or can return information indicative of interference and the need to adjust one or more modulation coding schemes. The transmitter/receiver component 318 can be configured to transmit to, and/or receive data from, for example, one or more network equipment, and/or one or more user equipment. Through the transmitter/receiver component 318, the network equipment 300 can concurrently transmit and receive data, can transmit and receive data at different times, or combinations thereof.

Figure 4:
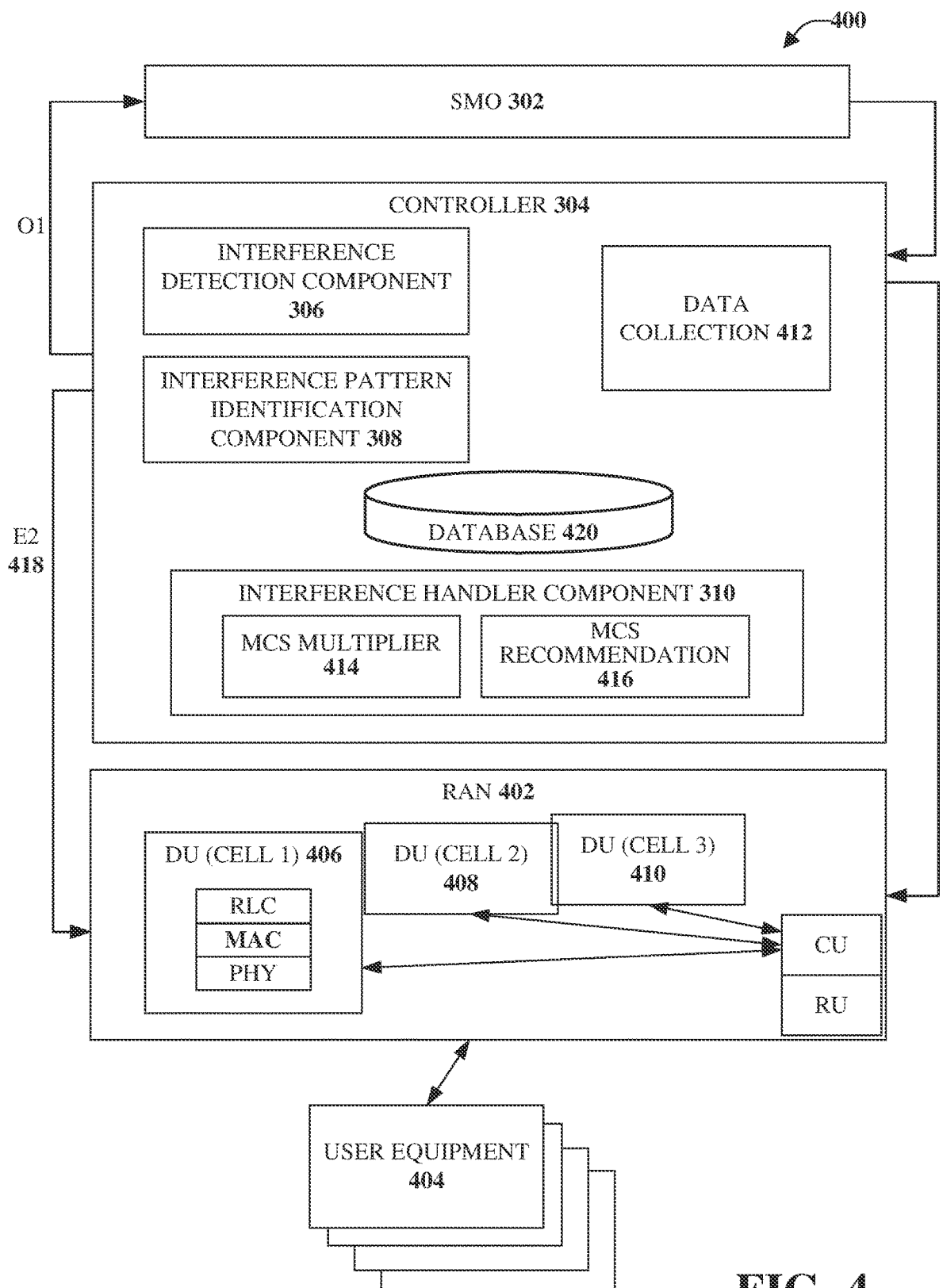
FIG. 4 illustrates an example, non-limiting, communication network for modulating coding adjustment based on interference in accordance with one or more embodiments described herein.

FIG. 4 illustrates an example, non-limiting, communication network 400 for MCS adjustment based on interference in accordance with one or more embodiments described herein. The communication network 400 can be various types of networks including, for example, a 5G network, a NR network, a 6G network, a disaggregated network, and so on. Repetitive description of like elements employed in other embodiments described herein is omitted for sake of brevity. The communication network 400 can be configured to perform functions associated with the network equipment 300 of FIG. 3, the computer-implemented methods discussed herein, and/or other embodiments discussed herein.

As illustrated, the communication network 400 includes network equipment (e.g., the SMO 302, the controller 304, and a Radio Access Network (RAN 402)). Also included in the communication network 400 are one or more UEs 404. The RAN 402 can include one or more DUs, associated with respective cells. Illustrated are a first DU 406 (cell 1), a second DU 408 (cell 2), and at least a third DU 410 (cell 3). Each DU can include various layers including a (radio link control) RLC layer, a (medium access control) MAC layer, and a (physical) PHY layer. Each DU can interface with a centralized unit (CU), as illustrated. Also included in the RAN 402 is a radio unit (RU).

As discussed, the interference detection component 306 analyzes respective HARQ feedback received from the one or more UEs 404 and can detect interference events based on HARQ NACKs. Receipt of the feedback can be facilitated and retained by a data collection component 412 of the controller 304. The interference pattern identification component 308 uses data from the interference detection component 306 to identify patterns of interference for each UE of the one or more UEs 404. The interference handler component 310 can determine an action (e.g., from a group of actions) that should be taken based on the interference pattern determined by the interference detection component 306.

The interference handler component 310 is associated with a MCS calculator component (not shown) that is responsible for providing, based on provided inputs, a MCS multiplier 414 and a MCS recommendation 416. The interference handler component 310 sends a suggested action to the DU MAC scheduler as an E2 message 418.

A database 420, included in (or accessible by) the controller 304, can store various performance indicators (e.g., key performance indicators). Further, the database 420 can store interference pattern information and output action information from the interface handler.

In further detail, the communication network 400 can provide an Intercell Interference Avoidance (ICIA) service. The ICIA service receives feedback (e.g., via the transmitter/receiver component 318 of FIG. 3) for each UE connected to an E2 node. The feedback can be received continually, periodically (e.g., every couple of TTIs) or based on another time interval. The feed can be utilized by the network equipment (e.g., the controller 304 or another component) to detect any TTI-level interference a UE might be experiencing and recommend a decision to the E2 node on which Modulation Coding Scheme (MCS) should be used for scheduling transmission.

The disclosed embodiments can utilize machine learning-based interference pattern recognition and severity prediction to facilitate dynamic predictive modulation coding adjustment as discussed herein. For example, pattern recognition techniques can be utilized to identify inter-cell interference patterns based on features such as, for example, channel condition data and/or UE HARQ feedback list (also referred to as a data structure). Underlying patterns can be used to enable a proactive approach to avoid interference in periodic traffic use-cases.

Additionally, or alternatively, ML models can be utilized for predicting interference severity. Such predictions can be used for recommending appropriate MCS for affected UEs and prioritizing affected UEs. For example, to prioritize affected UEs, the UEs identified as having a higher severity interference can be scheduled first (e.g., before other UEs that have a lower severity interference).

As discussed, provided is a dynamic MCS recommendation for optimized spectral efficiency. The RIC can dynamically optimize the UE Quality of Service (Qos) by recommending MCS on a slot-level to the scheduler. In such a manner inter-cell interference can be decreased when detected without completely banning slots for the scheduler. In addition, when interference is no longer in effect, spectral efficiency can be retained (e.g., increased or returned to previous levels) as fast as possible. This decision can be triggered from the RIC, as it continuously collects measurements and KPIs from the RAN E2 node (e.g., DU) over the E2 interface connecting them.

Further, interference severity prediction can be used as a multiplier for adjusting MCS accordingly. This can balance the tradeoff between QoS by decreasing interference and spectral efficiency caused by decreased MCS.

The Near-RT-RIC can identify the following parameters. For each UE, the RIC can collect the following network measurements from the DU: RSRP, RSRQ. SINR, and HARQ feedback. Using one or more of these measurements, the RIC can detect, for each TTI, if there exists a NACK that matches an interference pattern. For each interference, the MCS calculator can calculate a multiplier to be used to scale down the UEs MCS. This MCS multiplier can then be communicated to the DU scheduler to achieve better performance. If MCS is part of the inputs being collected, the new MCS can be reported to the DU directly.

Figure 5:
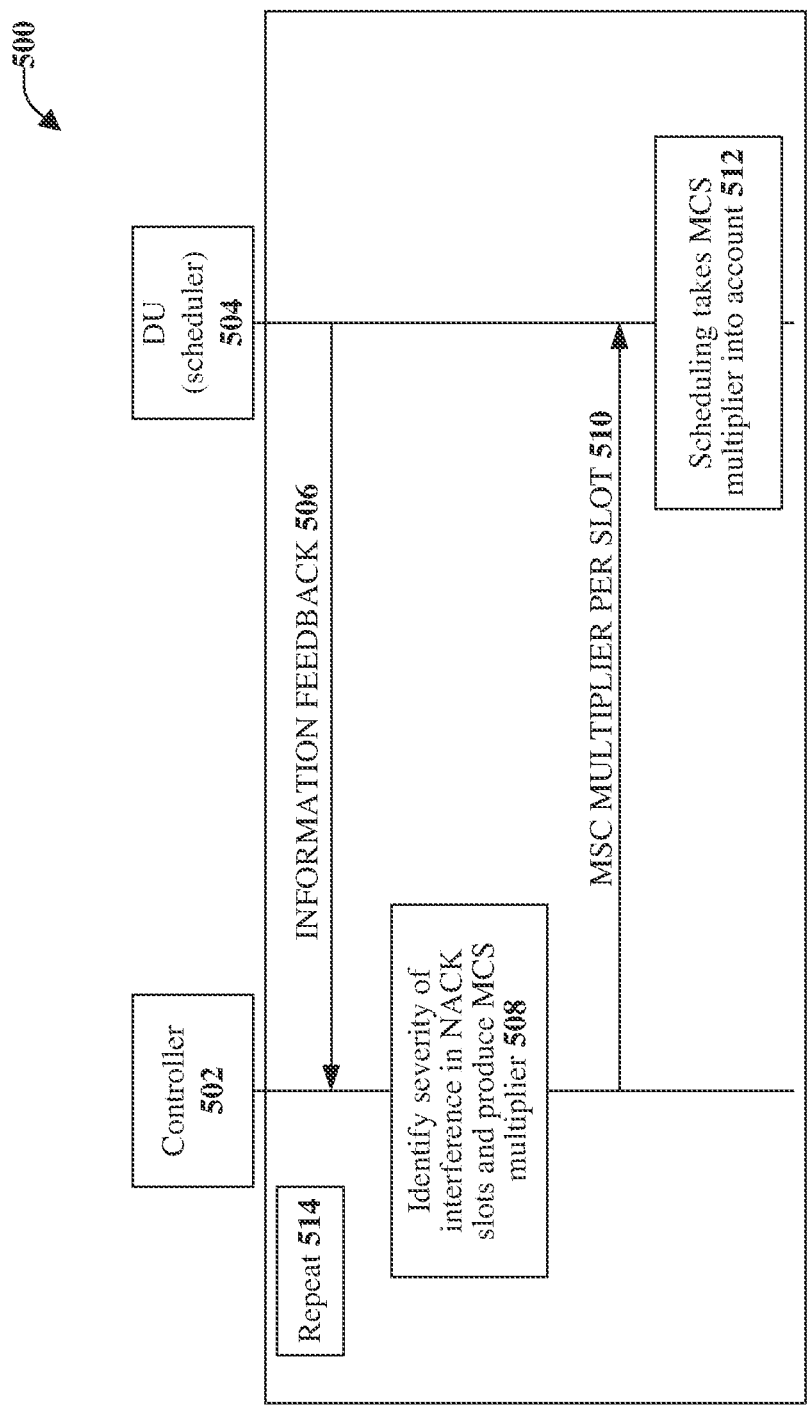
FIG. 5 illustrates an example, non-limiting, message sequence flow chart that can facilitate dynamic predictive modulation coding adjustment via a modulation coding procedure multiplier in accordance with one or more embodiments described herein.

FIG. 5 illustrates an example, non-limiting, message sequence flow chart 500 that can facilitate dynamic predictive modulation coding adjustment via an MCS multiplier in accordance with one or more embodiments described herein. The message sequence flow chart 500 can be utilized for various networks including new radio, as discussed herein. As illustrated, the message sequence flow chart 500 represents the message sequence between a controller 502 and a DU (scheduler) 504.

As indicated at 506, various information can be sent from the DU 504 to the controller 502. The various information can be HARQ feedback and/or network measurements. For example, the information can include RSRP, SINR, RSRQ, and so on. Upon or after receipt of the various information, the controller 502 can perform interference detection and pattern identification processes. As indicated at 508, based on the severity, the MCS calculator can output a multiplier to efficiently decrease the MCS. Information indicative of the MCS multiplier to slot can be transmitted, at 510 from the controller 502 to the DU 504. Upon or after receipt of the information indicative of the MCS multiplier is received, the DU 504 can perform, at 512, a process of scheduling while considering the MCS. As indicated at 514, the message sequence flow chart 500 can repeat as needed, periodically, continually, based on detection of an event, and/or based on another parameter.

Figure 6:
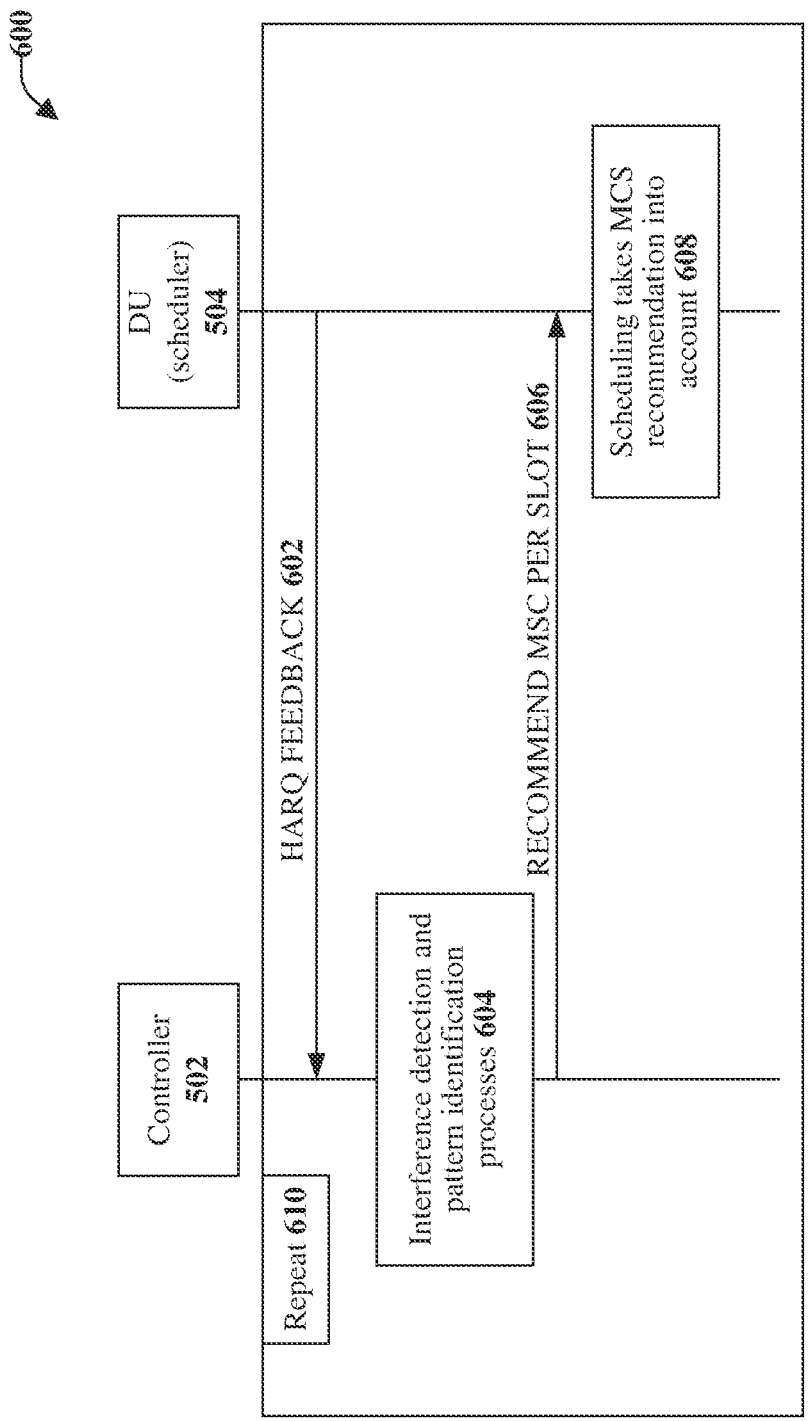
FIG. 6 illustrates an example, non-limiting, message sequence flow chart that can facilitate MCS recommendations in accordance with one or more embodiments described herein.

FIG. 6 illustrates an example, non-limiting, message sequence flow chart 600 that can facilitate MCS recommendations in accordance with one or more embodiments described herein. Repetitive description of like elements employed in other embodiments described herein is omitted for sake of brevity. The message sequence flow chart 600 can be utilized for various networks including new radio, as discussed herein. As illustrated, the message sequence flow chart 600 represents the message sequence between the controller 502 and the DU (scheduler) 504.

At 602, information indicative of HARQ feedback and network measurements are conveyed from the DU 504 to the controller 502. The information indicative of the network measurements can include, but are not limited to, RSRP, SINR, RSRQ, MCS, and so forth. The controller 502 goes through one or more interference detection and pattern identification processes, at 604. For example, during these one or more processes, the controller 502 can identify the severity of interference in NACK slot and can determine (or produce) an MCS multiplier. Based on the severity, the controller (e.g., an MCS calculator or MCS determiner) outputs information indicative of the recommended MCS (per slot), which is transmitted to the DU 504 at 606. Based on the recommended MCS, at 608, the DU 504 performs scheduling while considering the MCS recommendation. As indicated at 610, the message sequence flow chart 600 can repeat as needed, periodically, continually, based on detection of an event, and/or based on another parameter.

Figure 7:
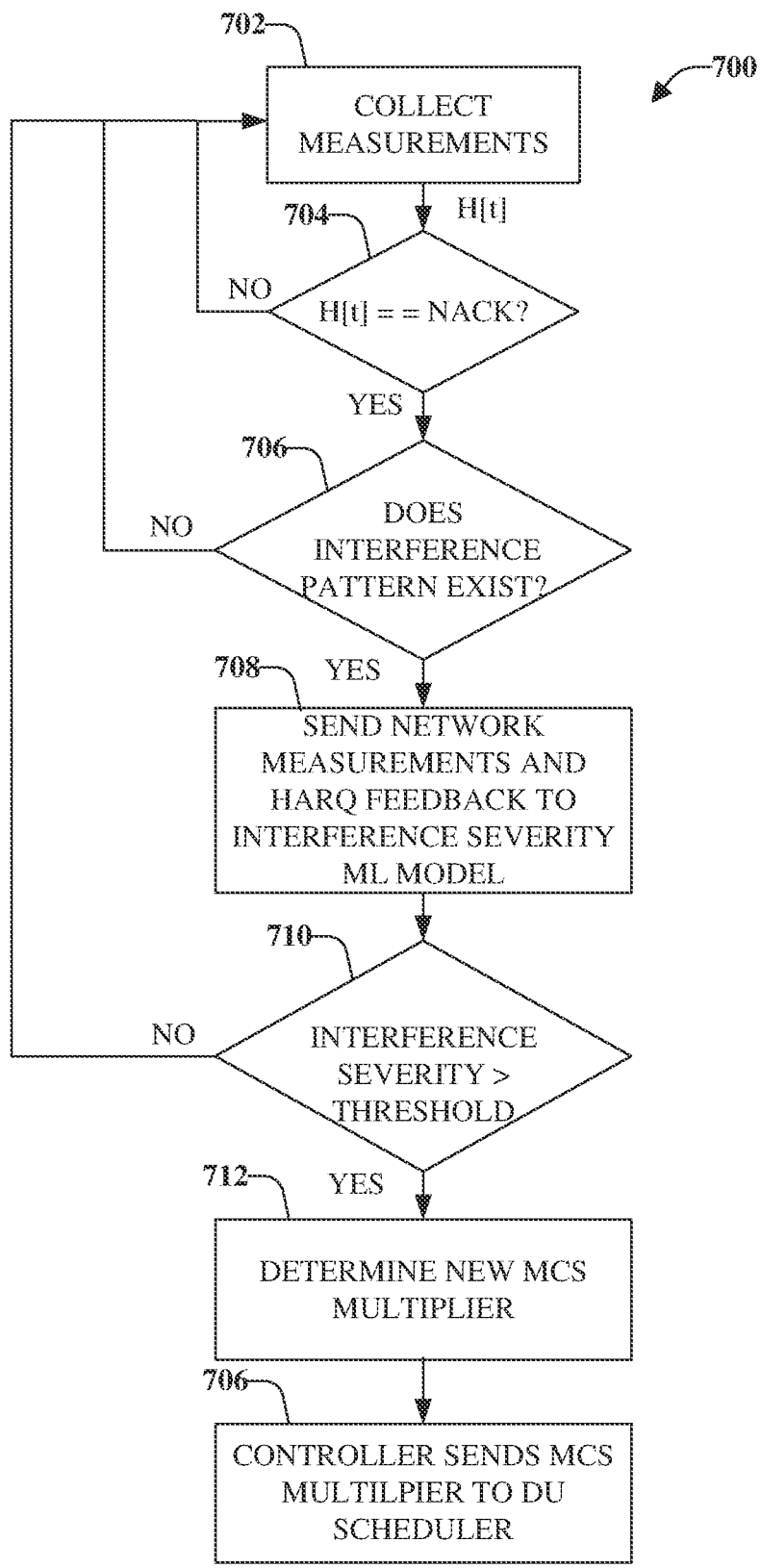
FIG. 7 illustrates a flow diagram of an example, non-limiting, computer-implemented method that facilitates predictive modulation coding adjustment for intercell interference in accordance with one or more embodiments described herein.

FIG. 7 illustrates a flow diagram of an example, non-limiting, computer-implemented method 700 that facilitates predictive modulation coding adjustment for intercell interference in accordance with one or more embodiments described herein. The computer-implemented method 700 and/or other methods discussed herein can be implemented by network equipment comprising a processor. According to another example, the computer-implemented method can be implemented by a system comprising a processor and a memory.

The computer-implemented method 700 starts at 702, when measurements are collected. For example, the measurements can be received from one or more other equipment (e.g., network equipment, user equipment, and so on), or can be measured by the equipment executing the computer-implemented method 700. The measurements can include information such as, for example, per-UE HARQ feedback and/or network measurements (e.g., RSRP, RSRQ, SINR), and so forth.

A determination is made, at 704, whether HARQ feedback (H) has been received from a UE over time (t) and/or whether a NACK has been received. If there has been no HARQ feedback over time, or a NACK has not been received, the computer-implemented method 700 returns to 702 with further collection of measurements.

If it is determined that the equivalent of a NACK has been received, for example, receipt of a NACK, or non-receipt of HARQ feedback over a defined amount of time ("YES"), the computer-implemented method 700 continues, at 706, and a determination is made whether an interference pattern has been determined to exist. For example, the per UE HARQ feedback can be used to determine whether an interference pattern exists. This is performed by monitoring the NACKs received and checking whether such NACKs are a part of an interference.

If it is determined that no pattern exists ("NO"), the computer-implemented method 700 returns to 702 and measurements are collected. If it is determined at 706 that an interference pattern does exist ("YES"), at 708 network measurements and HARQ feedback is transmitted to the interference severity ML model.

Upon or after an interference is detected, using the network measurements, interference severity is assessed. At 710, a determination is made whether the interference severity level is more than a defined threshold level. If the severity level is not more than the defined threshold level ("NO"), the computer implemented method 700 returns to 702. Alternatively, if it is determined that the interference severity being experienced is over the threshold ("YES"), at 712, the MCS calculator (e.g., ML model) can determine the new MCS multiplier. For example, when a severe interference is above a certain threshold, the controller can use a MCS calculator to compute a new MCS multiplier. The MCS multiplier recommendation is sent from the controller to the DU scheduler, at 714. For example, the controller passes the MCS multiplier and/or recommended MCS to the DU scheduler to achieve a better performance for that UE.

The Machine Learning models discussed herein can be trained offline and deployed to a Near-RT-RIC through the SMO (O1 interface). Alternatively, real network data stored in the database may be used to automatically (periodically or triggered by model deterioration) retrain the detection models in the Non-RT RIC and deploy them to the Near-RT-RIC over the A1 interface.

Figure 8:
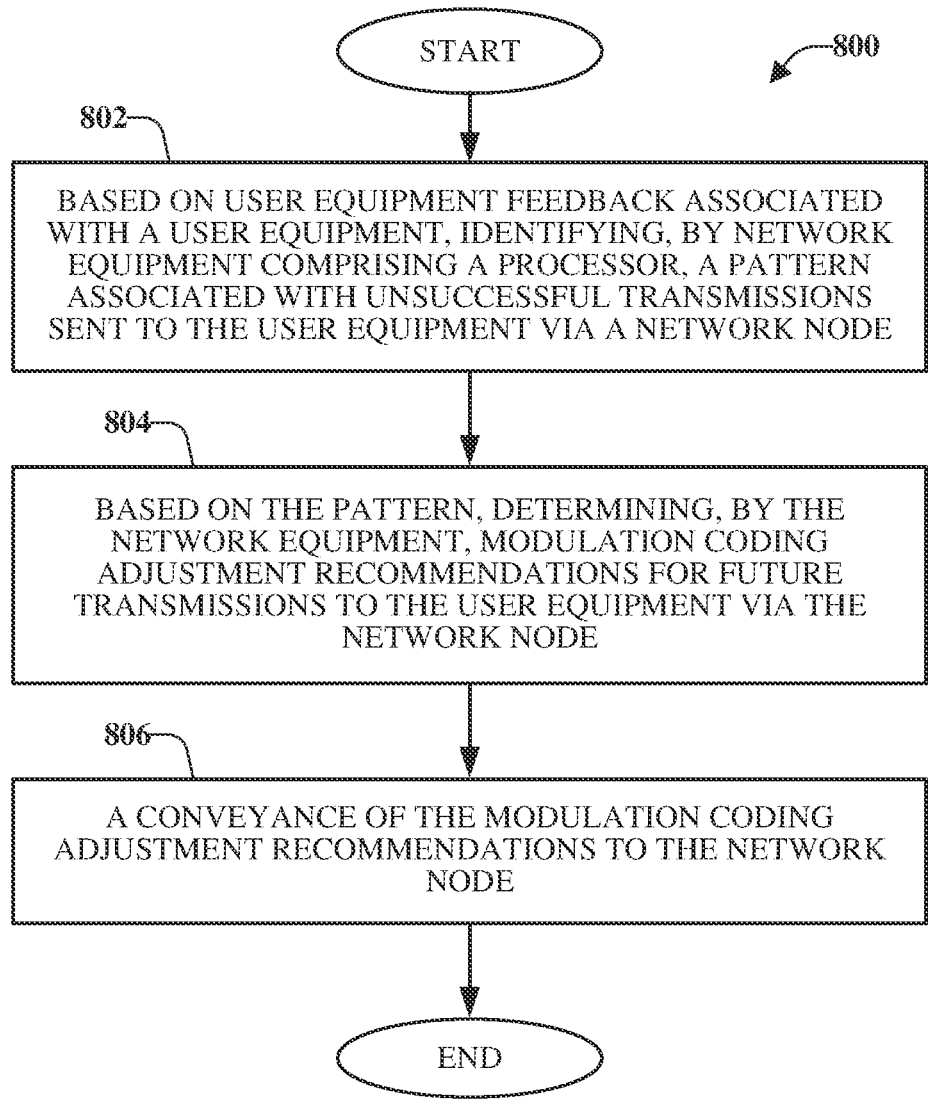
FIG. 8 illustrates a flow diagram of an example, non-limiting, computer-implemented method that facilitates modulation coding recommendations in accordance with one or more embodiments described herein.

FIG. 8 illustrates a flow diagram of an example, non-limiting, computer-implemented method 800 that facilitates MCS recommendations in accordance with one or more embodiments described herein. The computer-implemented method 800 and/or other methods discussed herein can be implemented by network equipment comprising a processor. According to another example, the computer-implemented method can be implemented by a system comprising a processor and a memory.

The computer-implemented method 800 includes, at 802, based on user equipment feedback associated with a user equipment, identifying, by network equipment comprising a processor, a pattern associated with unsuccessful transmissions sent to the user equipment via a network node. The user equipment feedback can include at least one of hybrid automatic repeat request information and reference signal received quality information. The network equipment can be implemented within a disaggregated architecture that comprises central units, distributed units, and a near-real-time-radio access network intelligent controller.

According to some implementations, the user equipment feedback can include indications of previous successful transmissions and previous unsuccessful transmissions to the user equipment via the network node. Further to these implementations, the user equipment feedback can include time information associated with the previous successful transmissions and the previous unsuccessful transmissions to the user equipment via the network node. In an example, the time information can indicate time slots of the previous successful transmissions and the previous unsuccessful transmissions to the user equipment via the network node. Further to this example, the modulation coding adjustment recommendations can include data rate recommendations for the time slots of the future transmissions to the user equipment via the network node.

At 804, based on the pattern, the network equipment determines modulation coding adjustment recommendations for future transmissions to the user equipment via the network node. At 806, the network equipment facilitates a conveyance of the modulation coding adjustment recommendations to the network node. In an example, identifying the pattern, determining the modulation coding adjustment recommendations, and facilitating the conveyance are performed in a repeating cycle having a cycle frequency.

In an implementation, determining the modulation coding adjustment recommendations can include applying machine learning to the user equipment feedback in order to receive an output from the machine learning comprising the modulation coding adjustment recommendations. According to another implementation, determining the modulation coding adjustment recommendations can include determining the modulation coding adjustment recommendations based on a transmission time interval basis.

In some implementations, determining the modulation coding adjustment recommendations can include assigning a severity rate to previous unsuccessful transmissions. Based on the severity rate being determined to fail to satisfy a defined criterion, determining a first decrease of a current modulation coding by a first value. Alternatively, based on the severity rate being determined to satisfy the defined criterion, determining a second decrease of the current modulation coding by a second value, wherein the second value is larger than the first value.

Figure 9:
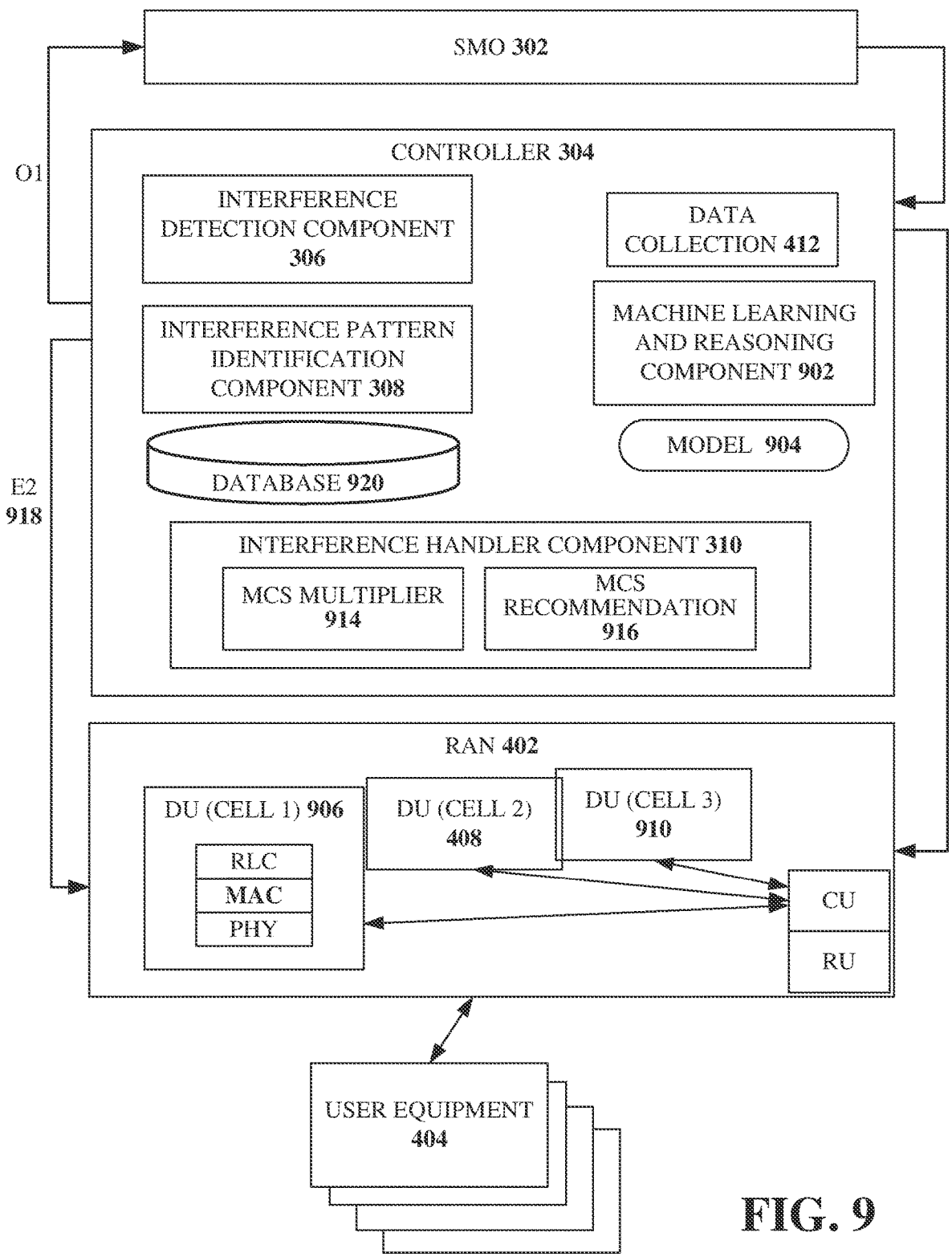
FIG. 9 illustrates an example, non-limiting, system that employs automated learning that trains a model to facilitate one or more of the disclosed aspects in accordance with one or more embodiments described herein.

FIG. 9 illustrates an example, non-limiting, system 900 that employs automated learning that trains a model to facilitate one or more of the disclosed aspects in accordance with one or more embodiments described herein. Repetitive description of like elements employed in other embodiments described herein is omitted for sake of brevity. The system 900 can comprise one or more of the components and/or functionality of the wireless communication system 200 of FIG. 2, the network equipment 300 of FIG. 3, the communication network 400 of FIG. 4, the message sequence flow chart 500 of FIG. 5, the message sequence flow chart 600 of FIG. 6, the computer-implemented method 700 of FIG. 7, the computer-implemented method 800 of FIG. 8, and vice versa.

As illustrated, the network equipment 300 can comprise a machine learning and reasoning component 902 that can be utilized to automate one or more of the disclosed aspects based on training a model 904. The machine learning and reasoning component 902 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 902 can employ principles of probabilistic and decision theoretic inference. Additionally, or alternatively, the machine learning and reasoning component 902 can rely on predictive models (e.g., the model 904) constructed using machine learning and/or automated learning procedures. Logic-centric inference can also be employed separately or in conjunction with probabilistic methods.

The machine learning and reasoning component 902 can infer a modulation coding adjustment to be utilized by obtaining knowledge about a level of interference experienced within a communication network, a pattern of interference (which can be an inferred pattern of interference), a severity of interference, and so on. Based on this knowledge, the machine learning and reasoning component 904 can make an inference whether to keep a current MCS level, reduce the MCS level, increase the MCS level, or combinations thereof.

As used herein, the term "inference" refers generally to the process of reasoning about or inferring states of a system, a component, a module, an environment, and/or devices from a set of observations as captured through events, reports, data, and/or through other forms of communication. Inference can be employed to identify one or more patterns of interference and/or a MCS to implement based on the pattern of interference, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating dynamic predictive modulation coding adjustment) can employ various artificial intelligence-based schemes for carrying out various aspects thereof. For example, a process for determining if a particular MCS should be used for a particular interference pattern can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to determine whether an adjustment to a MSC is to be automatically performed, a severity level associated with the interference, which can be utilized to infer a scheduling priority as discussed herein.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by obtaining current information, by obtaining historical information, by receiving extrinsic information, and so on). For example, SVMs can be configured through a learning or training phase. Thus, a classifier(s) can be used to automatically learn and perform a number of functions, including but not limited to determining, according to a predetermined criterion, whether interference is experienced at a UE, a pattern associated with the interference, a severity level of the interference (for scheduling priority), a SLA associated with a UE (for scheduling priority), a MSC adjustment that should be implemented based on the pattern, and an amount of time before another MSC adjustment should be implemented (e.g., return to a previous MSC, change to a different MSC, and so on).

Additionally, or alternatively, an implementation scheme (e.g., a rule, a policy, and so on) can be applied to control and/or regulate MSC adjustment as discussed herein. In some implementations, based upon a predefined criterion, the rules-based implementation can automatically and/or dynamically apply the MSC adjustment, as opposed to outputting a recommendation. In response thereto, the rule-based implementation can automatically interpret and carry out functions associated with the MSC adjustment by employing a predefined and/or programmed rule(s) based upon any desired criteria.

According to some implementations, seed data (e.g., a data set) can be utilized as initial input to the model 904 to facilitate the training of the model 904. In an example, if seed data is utilized, the seed data can be obtained from one or more historical data associated with channel state information and/or other information indicative of UE based feedback and measurements. However, the disclosed embodiments are not limited to this implementation and seed data is not necessary to facilitate training of the model 904. Instead, the model 904 can be trained on new data received (e.g., via a feedback loop).

The data (e.g., seed data and/or new data, including feedback data) can be collected and, optionally, labeled with various metadata. For example, the data can be labeled with an indication of the communication protocol being utilized for communication, or other data, such as identification of respective equipment that provided one or more signals, a time the one or more signals were received, the content of the one or more signals, and so on.

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client." "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 10:
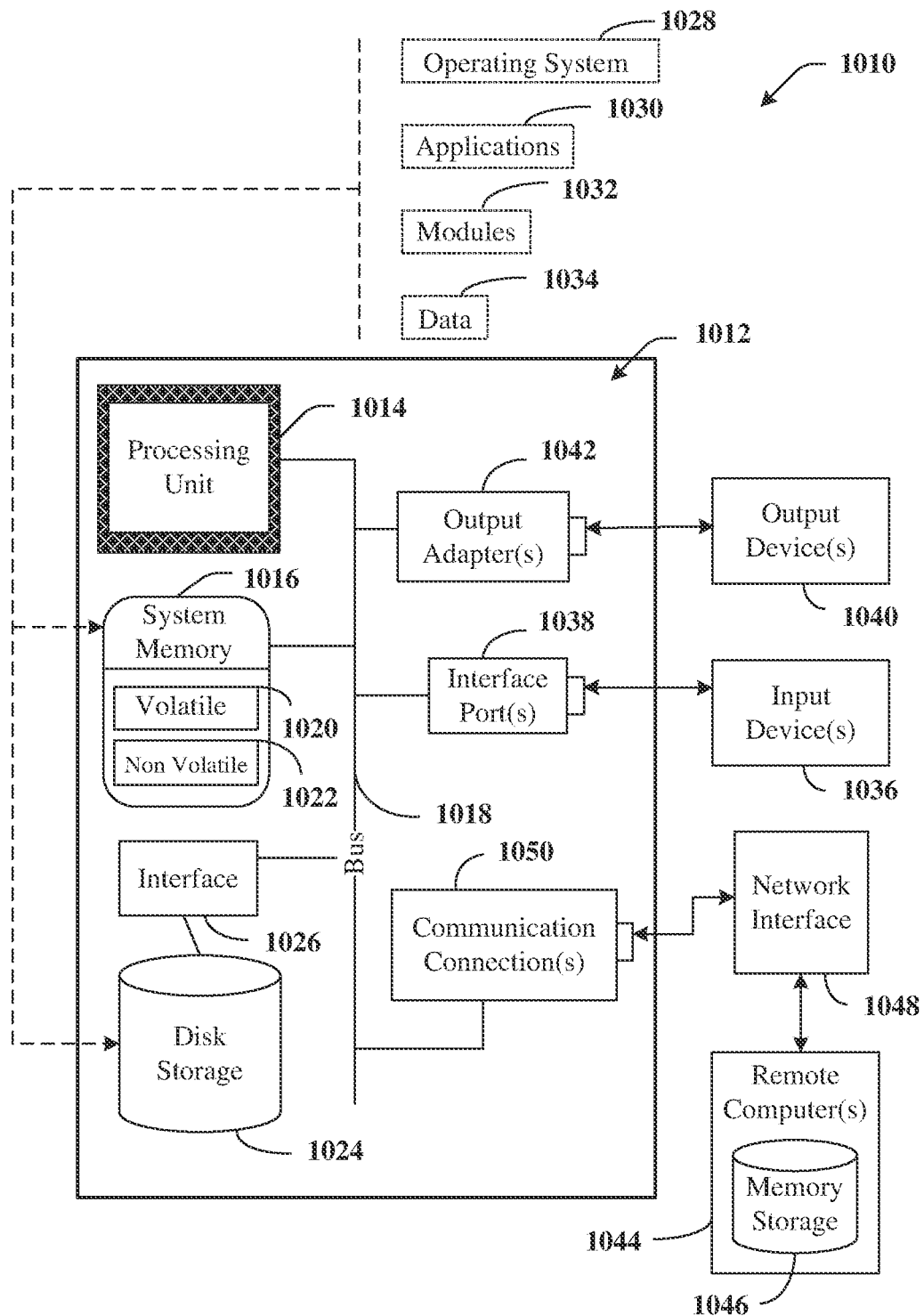
FIG. 10 illustrates an example, non-limiting, computing environment in which one or more embodiments described herein can be facilitated.

In order to provide a context for the various aspects of the disclosed subject matter, FIG. 10 as well as the following discussion are intended to provide a brief, general description of a suitable environment in which the various aspects of the disclosed subject matter can be implemented.

With reference to FIG. 10, an example environment 1010 for implementing various aspects of the aforementioned subject matter comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multicore microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 comprise, for example, a serial port, a parallel port, a game port, and a universal serial bus (USB). Output device(s) 1040 can use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal, and external technologies such as, modems including regular telephone grade modems, cable modems and DSL modems, ISDN adapters, and Ethernet cards.

Figure 11:
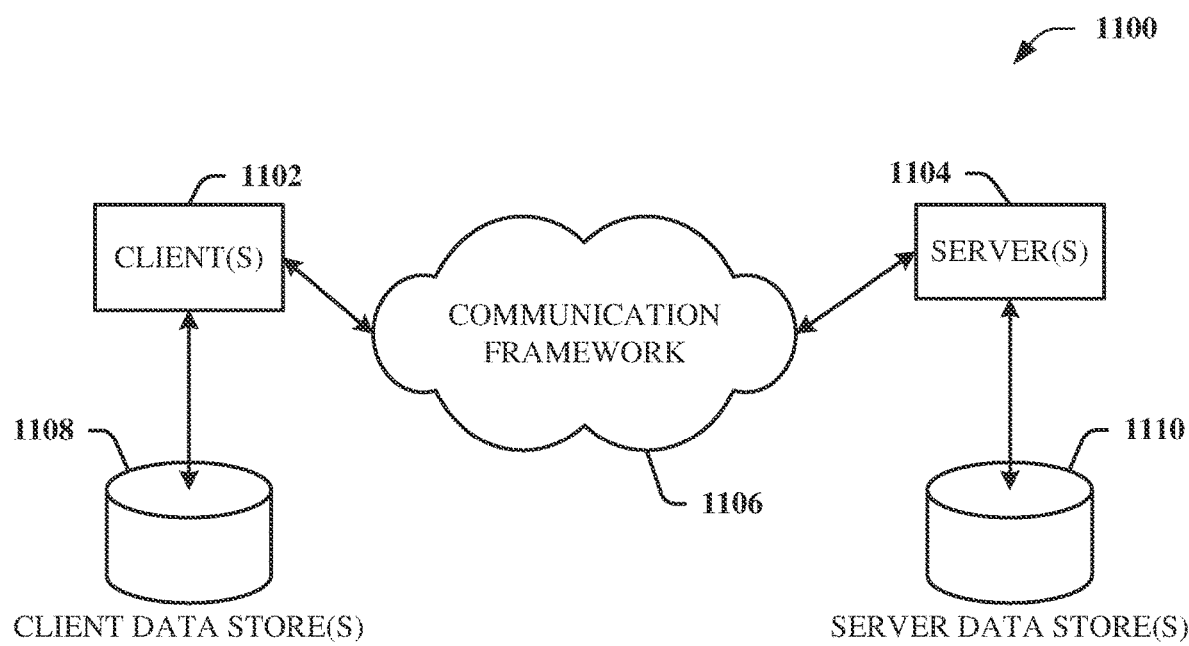
FIG. 11 illustrates an example, non-limiting, networking environment in which one or more embodiments described herein can be facilitated.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, when the term "set" is used (e.g., "a set of carriers," "a set of cells," and so on) it means a non-zero set, 'at least one', or 'one or more'. In a similar manner, when the term subset is used, it means a non-zero set, 'at least one', or 'one or more'.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    based on user equipment feedback associated with a user equipment of a group of user equipment, identifying, by network equipment comprising a processor, a pattern associated with unsuccessful transmissions sent to the user equipment via a network node;
    based on the pattern, determining, by the network equipment, modulation coding adjustment recommendations for future transmissions to the user equipment via the network node, wherein the determining comprises:
        evaluating an estimated decrease in interference compared to a corresponding estimated decrease in spectral efficiency for the modulation coding adjustment recommendations, and
        based on the evaluating, scaling a level of a modulation coding scheme for the user equipment from a first level to a second level, the second level is less than the first level, and wherein the scaling avoids banning slots for the user equipment and avoids diversion of the user equipment to an alternative resource; and
    facilitating, by the network equipment, application of the modulation coding adjustment recommendations to the user equipment during a future transmission, wherein the facilitating is based on a conveyance of the modulation coding adjustment recommendations to the network node.

2. The method of claim 1, wherein the user equipment feedback comprises reference signal received quality information.

3. The method of claim 1, wherein the user equipment feedback comprises:
    indications of previous successful transmissions and previous unsuccessful transmissions to the user equipment via the network node; and
    time information associated with the previous successful transmissions and the previous unsuccessful transmissions to the user equipment via the network node.

4. The method of claim 3, wherein the time information indicates time slots of the previous successful transmissions and the previous unsuccessful transmissions to the user equipment via the network node, and wherein the modulation coding adjustment recommendations comprise data rate recommendations for the time slots of the future transmissions to the user equipment via the network node.

5. The method of claim 1, wherein the determining the modulation coding adjustment recommendations comprises applying machine learning to the user equipment feedback in order to receive an output from the machine learning comprising the modulation coding adjustment recommendations.

6. The method of claim 1, wherein the determining the modulation coding adjustment recommendations comprises:
    assigning a severity rate to previous unsuccessful transmissions; and
    performing one of:
        based on the severity rate being determined to fail to satisfy a defined criterion, determining a first decrease of a current modulation coding by a first value; and
        based on the severity rate being determined to satisfy the defined criterion, determining a second decrease of the current modulation coding by a second value, wherein the second value is larger than the first value.

7. The method of claim 1, wherein the determining the modulation coding adjustment recommendations comprises determining the modulation coding adjustment recommendations based on a transmission time interval basis.

8. The method of claim 1, wherein the identifying the pattern, the determining the modulation coding adjustment recommendations, and the facilitating the conveyance are performed in a repeating cycle having a cycle frequency.

9. The method of claim 1, wherein the network equipment is implemented within a disaggregated architecture that comprises central units, distributed units, and a near-real-time-radio access network intelligent controller.

10. The method of claim 1, wherein the network equipment is configured to operate according to a new radio network communication protocol.

11. Network equipment, comprising:
    a processor; and
    a memory that stores executable instructions that, when executed by the processor, facilitate performance of operations, wherein the operations comprise:
        sending user equipment feedback to a controller, wherein the user equipment feedback is associated with a defined user equipment or a group of user equipment;
        receiving, from the controller, modulation coding adjustment recommendations to apply to future transmissions to the defined user equipment via the network equipment, wherein the modulation coding adjustment recommendations were determined based on the user equipment feedback;
        after the receiving, using the modulation coding adjustment recommendations to send a transmission of the future transmissions to the defined user equipment at a defined data rate, wherein the modulation coding adjustment recommendations are utilized in lieu of banning slots for the defined user equipment or diverting the defined user equipment to an alternative resource; and
        sending the transmission to the defined user equipment using the defined data rate.

12. The network equipment of claim 11, wherein the user equipment feedback comprises:
    indications of previous successful transmissions and previous unsuccessful transmissions to the defined user equipment via the network equipment; and
    time information associated with the previous successful transmissions and the previous unsuccessful transmissions to the defined user equipment via the network equipment.

13. The network equipment of claim 12, wherein the time information indicates time slots of the previous successful transmissions and the previous unsuccessful transmissions to the defined user equipment via the network equipment, and wherein the modulation coding adjustment recommendations comprise time slot recommendations for data rates of the future transmissions to the defined user equipment via the network equipment.

14. The network equipment of claim 11, wherein the user equipment feedback comprises reference signal received quality information.

15. The network equipment of claim 11, wherein the sending the user equipment feedback and the receiving the modulation coding adjustment recommendations are performed in a repeating cycle having a cycle frequency.

16. The network equipment of claim 11, wherein the sending the user equipment feedback to the controller is performed in response to a request from the controller.

17. The network equipment of claim 11, wherein the network equipment is configured to operate according to at least a fifth generation network communication protocol.

18. A non-transitory machine-readable medium, comprising executable instructions that, when executed by a processor of network equipment, facilitate performance of operations, comprising:
based on user equipment feedback received from a single user equipment of a group of user equipment, identifying a recurring pattern of unsuccessful transmissions sent to the single user equipment via a network node;
based on the recurring pattern, determining rate adjustment recommendations to apply to future transmissions to the single user equipment via the network node, wherein the determining comprises:
evaluating a tradeoff between an estimated decrease in interference and a corresponding estimated decrease in spectral efficiency for the rate adjustment recommendations, and
based on the evaluating, scaling a modulation coding scheme for the single user equipment from a first level to a second level, the second level is less than the first level, and wherein the scaling it utilized instead of banning slots for the single user equipment or diverting the single user equipment to a defined resource; and
sending the rate adjustment recommendations to the network node.

19. The non-transitory machine-readable medium of claim 18, wherein the determining the rate adjustment recommendations comprises determining the rate adjustment recommendations on a transmission time interval basis.

20. The non-transitory machine-readable medium of claim 18, wherein the determining the rate adjustment recommendations comprises:
assigning a severity rate to previous unsuccessful transmissions; and
performing one of:
based on the severity rate being determined to fail to satisfy a function of a defined amount, determining a first decrease of a current modulation coding by a first value; and
based on the severity rate being determined to satisfy the function of the defined amount, determining a second decrease of the current modulation coding by a second value, wherein the second value is larger than the first value.

* * * * *